US011400870B2

(12) United States Patent
Walz

(10) Patent No.: US 11,400,870 B2
(45) Date of Patent: Aug. 2, 2022

(54) SENSOR RECEPTACLE FOR RECEIVING A SENSOR OF A MOTOR VEHICLE AND A TRIM COMPONENT OF A MOTOR VEHICLE WITH SUCH SENSOR RECEPTACLE

(71) Applicant: MOTHERSON INNOVATIONS COMPANY LIMITED, London (GB)

(72) Inventor: Jochen Walz, Eichstetten (DE)

(73) Assignee: Motherson Innovations Company Limited, London (GB)

( * ) Notice: Subject to any disclaimer, the term of this patent is extended or adjusted under 35 U.S.C. 154(b) by 340 days.

(21) Appl. No.: 16/690,910

(22) Filed: Nov. 21, 2019

(65) Prior Publication Data

US 2020/0164815 A1 May 28, 2020

(30) Foreign Application Priority Data

Nov. 26, 2018 (EP) .................................... 18208335

(51) Int. Cl.
*B60R 13/02* (2006.01)
*B60R 16/03* (2006.01)
(Continued)

(52) U.S. Cl.
CPC .............. *B60R 13/02* (2013.01); *B60R 16/03* (2013.01); *B60R 2013/0287* (2013.01);
(Continued)

(58) Field of Classification Search
CPC . B60R 13/02; B60R 16/03; B60R 2013/0287; G01S 7/027; G01S 7/03; G01S 7/521
See application file for complete search history.

(56) References Cited

U.S. PATENT DOCUMENTS 6,318,774 B1 11/2001 Karr et al.
2018/0037267 A1* 2/2018 Williams ................ B60R 11/04

FOREIGN PATENT DOCUMENTS

DE 197 19 519 A1 11/1998
DE 100 31 111 A1 1/2002
(Continued)

OTHER PUBLICATIONS

European Search Report dated Jan. 23, 2019 with respect to counterpart European patent application 18 20 8335.
(Continued)

*Primary Examiner* — Lori L Lyjak
(74) *Attorney, Agent, or Firm* — Ursula B. Day, Esq.

(57) ABSTRACT

A sensor receptacle for receiving a sensor of a motor vehicle is disclosed. The receptacle includes a wall enclosing a cavity with a first opening and a second opening and which defines a longitudinal axis (L), wherein the sensor can be introduced into the cavity by a movement along the longitudinal axis (L) through the first opening and/or through the second opening. A joining flange is arranged in the region of the first opening and the sensor receptacle is connected by way of the joining flange to a trim component of the motor vehicle by forming a cavity between the sensor receptacle and the trim component, such that the sensor receptacle can be connected to the trim component by way of a filling and fastening agent that fills the cavity, and wherein a protrusion is arranged on the joining flange and extending along the longitudinal axis (L). The joining flange and the protrusion are formed such that the filling agent is displaced away from the cavity when connecting the sensor receptacle with the trim component.

15 Claims, 1 Drawing Sheet

(51) Int. Cl.
   *G01S 7/03*    (2006.01)
   *G01S 7/521*   (2006.01)
   *G01S 7/02*    (2006.01)

(52) U.S. Cl.
   CPC ............... *G01S 7/027* (2021.05); *G01S 7/03* (2013.01); *G01S 7/521* (2013.01)

(56) References Cited

FOREIGN PATENT DOCUMENTS

| | | | | |
|---|---|---|---|---|
| DE | 102016210436 A1 | * | 12/2017 | ............. G01S 7/521 |
| EP | 2924398 A2 | * | 9/2015 | ......... B60R 21/0134 |
| EP | 3 118 065 A1 | | 1/2017 | |
| FR | 2 978 400 A1 | | 2/2013 | |
| WO | WO 99/10876 A1 | | 3/1999 | |
| WO | WO 2009/144545 A1 | | 12/2009 | |
| WO | WO 2010/100225 A1 | | 9/2010 | |
| WO | WO 2012/055713 A1 | | 5/2012 | |
| WO | WO 2013/091774 A1 | | 6/2013 | |
| WO | WO 2013/161221 A1 | | 10/2013 | |

OTHER PUBLICATIONS

Translation of European Search Report dated Jan. 23, 2019 with respect to counterpart European patent application 18 20 8335.

* cited by examiner

SENSOR RECEPTACLE FOR RECEIVING A SENSOR OF A MOTOR VEHICLE AND A TRIM COMPONENT OF A MOTOR VEHICLE WITH SUCH SENSOR RECEPTACLE

CROSS-REFERENCES TO RELATED APPLICATIONS

This application claims the priority of European Patent Application, Serial No. 18 208 335.2, filed Nov. 26, 2018, pursuant to 35 U.S.C. 119(a)-(d), the disclosure of which is incorporated herein by reference.

BACKGROUND OF THE INVENTION

The present invention relates to a sensor receptacle for receiving a sensor of a motor vehicle. Furthermore, the invention relates to a trim component of a motor vehicle with such a sensor receptacle.

Many motor vehicles have assistance systems which assist the driver in the operation of the motor vehicle. An example of such assistance systems are parking aids (PDC: Park Distance Control), wherein the driver receives a visual and/or acoustic message about the remaining distance to an object in the vicinity of the motor vehicle when parking, so that the driver can prevent a collision with the object and thus damage to the motor vehicle and to the object while simultaneously making optimum use of the available parking space. Other examples are park steering assistants (PSA), whereby the motor vehicle is automatically steered into longitudinal and transverse parking spaces. Park steering assistants are also able to move the motor vehicle out of longitudinal parking spaces. Park steering assistants assist the driver by automatically performing the optimum steering wheel movements in order to move into and out of the parking space on the ideal line. The parking steering assistant takes over automatically measuring the parking space and assigning the start position and the steering movements. The driver only needs to accelerate and brake.

The functionality of these assistance systems is based on data measured by suitably constructed sensors, such as radar and/or ultrasound sensors. These sensors are arranged in or on the trim components of the motor vehicle, in particular in the bumper and side trim of the motor vehicle. Different numbers of sensors are required depending on the type of assistance systems of the motor vehicle. Typically, the motor vehicles have between four to six sensors in the bumper alone. The accuracy of the assistance systems and thus their reliability depend to a great extent from the exact position and orientation of each sensor relative to the trim components and the other sensors.

Trim components to which such sensors are attached are known from DE 197 19 519 A1, WO 2012/055713, WO 2013/091774 A1 and EP 3 118 065 A1. In EP 3118065 A1, the sensor receptacle is affixed on the trim component using a filling and fastening agent. The filling and fastening agent is used to affix the sensor receptacle on the trim component, but spaced therefrom by forming a cavity, with the filling and fastening agent filling the cavity. The sensor receptacle and consequently the sensor received therein can thus be attached with the required orientation even in a region where the trim component have curvatures, without having to use customized mating flanges adapted to the curvature. As a result, the production-related technical and logistical effort can be significantly reduced.

Typically, the sensor receptacle has a cavity formed by a wall, in which the sensor can be introduced, wherein the sensor is, for example, attached to the sensor receptacle by an interference fit. The employed filling and fastening agent may be liquid at the beginning of the connection process and cures during the bonding process, hereby producing the corresponding attachment of the sensor receptacle on the trim component. As mentioned above, in the EP 3 118 065 A1, the sensor receptacle is fixed on the trim component, spaced apart therefrom, by forming a cavity, with the filling and fastening agent filling the cavity. However, it has been observed that a portion of the liquid filling and fastening agent can still enter the cavity. The cured portion of the filling and fastening agent in the cavity can in a worst case scenario impair the function of the sensor. Moreover, the filling and fastening agent is not always distributed in such a way that the required withdrawal forces can be achieved.

SUMMARY OF THE INVENTION

It is an object of an embodiment of the present invention to provide a sensor receptacle, which can be connected to the trim component in a reliable and simple way. Furthermore, it is an object of an embodiment of the present invention to provide a trim component, to which such a sensor receptacle is attached so that the requirements placed on the attachment can be met. In particular, the attachment should be carried out so that the required withdrawal forces are reliably achieved and that even in the event that the sensor receptacle is to be attached to the trim component in an area with curvatures, the filling and fastening agent does not enter the cavity of the sensor receptacle.

This object and others are attained with features of the following paragraphs including an embodiment and further advantageous embodiments.

An embodiment of the invention relates to a sensor receptacle for receiving a sensor of a motor vehicle, comprising a wall which encloses a cavity having a first opening and a second opening and which defines a longitudinal axis, wherein the sensor can be introduced into the cavity by a movement along the longitudinal axis through the first opening and/or through the second opening, a joining flange arranged in the region of the first opening and constructed to connect the sensor receptacle to a trim component of the motor vehicle by forming a cavity between the sensor receptacle and the trim component, wherein the sensor receptacle can be connected to the trim component by a filling and fastening agent that fills the cavity, and a protrusion arranged on the joining flange and extending along the longitudinal axis, wherein the joining flange and the protrusion are formed such that the filling and fastening agent is displaced away from the cavity when the sensor receptacle is connected to the trim component.

The sensor receptacles disclosed in EP 3 118 065 A1 have in part joining flanges which however are not provided with protrusions extending along the longitudinal axis. In contrast, the proposed sensor receptacles have such protrusions, which are arranged on the joining flanges and operate as a kind of flow straightener. Consequently, the protrusions displace the liquid filling and fastening agent away from the cavity when the sensor receptacle is connected with the trim component. This prevents the filling and fastening agent from entering the cavity and there potentially impairing the functionality of the sensors. But at a minimum, the amount of the filling and fastening agent entering the cavity is reduced compared to the sensor receptacles disclosed in EP 3 118 065 A1 by so much that the filling and fastening agent reaching the cavity and cured in the cavity does not interfere with the function of the sensor.

According to another embodiment of the present invention, the wall forms an interior surface, with the joining flange being aligned with the interior surface. The sensor can be inserted very far into the sensor receptacle up to the first opening and guided by the interior surface. The sensors do not have to be adapted to cross-sectional changes of the cavity caused by the joining flange.

In another embodiment of the present invention, the protrusion may be aligned with the interior surface. In this embodiment too, the sensor can be inserted very far into the sensor receptacle up to the first opening, wherein it is guided by the interior surface. The sensors do not have to be adapted to cross-sectional changes of the cavity caused by the protrusion.

In another embodiment of the present invention, the joining flange and the protrusion may be formed circumferentially. The joining flange and the protrusion are thus formed without interruption. This increases, on the one hand, the joining surface between the trim component and the sensor receptacle and on the other hand, prevents particularly effectively penetration of the filling and fastening agent. In addition, the sensor receptacle can be attached on the trim component regardless of its rotational position.

In another embodiment of the present invention, the joining flange and the protrusion may be formed integrally with the wall. In this embodiment, the joining flange and the protrusion are formed by the wall, so that the entire sensor receptacle can be manufactured in a single manufacturing process. Joining steps for connecting the joining flange with the wall and for connecting the protrusion with the joining flange become unnecessary.

Another embodiment of the present invention is characterized in that the protrusion protrudes from the joining flange with an axial distance between 0.05 mm and 0.5 mm. It has been found that, with the typical size of the cavity or with the maximum achievable spacing between the sensor and the trim component, such an axial distance is particularly effective in preventing the filling and fastening agent from penetrating into the cavity of the sensor receptacle.

According to another embodiment of the present invention, the protrusion extends from the interior surface by a radial distance between 0.3 mm and 0.7 mm. It has been found that with the typically employed size of the cavity or with the maximum achievable spacing between the sensor and the trim component, such radial distance particularly effectively prevents the filling and fastening agent from penetrating into the cavity of the sensor receptacle.

Another embodiment of the present invention is characterized in that the joining flange has an end face pointing toward the first opening which is inclined relative to a plane extending perpendicular to the longitudinal axis by an end face angle, wherein the an end face angle points away from the first opening and is between 1° and 7° and in particular between 3° and 5°. The feature of having the end face angle pointing away from the first opening causes the axial distance of the end face to the first opening to increase radially outward. The inclination of the end face of the joining flange keeps the filling and fastening agent away from the cavity of the sensor receptacle. It has been observed that, with the described range of the end face angle, penetration of the filling and fastening agent into the cavity can be particularly effectively prevented. Typically, when mounting the sensor receptacle on the trim component, the filling and fastening agent is applied on the trim component first, and the sensor receptacle is subsequently pressed against the filling and fastening agent with a movement along the longitudinal axis of the sensor receptacle. Due to the inclination of the end face of the joining flange, this axial movement causes a radially outward displacement of the filling and fastening agent. At the same time, the filling and fastening agent is distributed so as to form a particularly large joining surface, whereby the thus produced connection provides high withdrawal forces.

Another embodiment of the present invention is characterized in that the joining flange has an outer surface which is inclined relative to the longitudinal axis by an outer surface angle, wherein the outer surface angle is between 1° and 5° and produces a taper of the joining flange toward the first opening. It has been found that such an outer surface angle also produces a particularly uniform distribution of the filling and fastening agent, so that the produced connection provides high withdrawal forces.

According to another embodiment of the present invention, the sensor receptacle is made of a plastic material, which is permeable to electromagnetic radiation of a wavelength between 350 nm and 450 nm. For some of the filling and fastening agent commonly used to affix the sensor receptacle to the trim component, curing may be initiated by the radiant energy contained in the electromagnetic radiation. In this way, the manufacturing process can be simplified, since the radiation source required for generating the electromagnetic radiation can then be switched on exactly when the sensor receptacle is in the desired position relative to the trim component and has attained the desired orientation. Because the sensor receptacle is permeable to electromagnetic radiation at a wavelength between 350 nm and 450 nm, the electromagnetic radiation can reach a large part of the surface of the filling and fastening agent, without causing partial shadowing which could delay curing of the filling and fastening agent. The wavelength between 350 nm and 450 nm produces visible light that appears violet-blue color to the human eye. In this way, on the one hand, the operability of the radiation source can be readily determined and, on the other hand, the electromagnetic radiation in this wavelength range contains sufficient radiation energy to initiate curing of the filling and fastening agent.

An embodiment of the present invention relates to a trim component of a motor vehicle including:
 one or more through openings,
 one or more sensor receptacles according to one of the previously discussed embodiments, wherein
 the sensor receptacles are arranged, by forming a cavity, at least partially spaced from the trim component in the region of one of the through openings,
 a filling and fastening agent for filling the cavity and attaching the sensor receptacles on the trim component.

The technical effects and advantages attainable with the proposed trim component correspond to those discussed above for the disclosed sensor receptacle. In summary, it should be noted that with the proposed design of the sensor receptacle, a particularly uniform distribution of the filling and fastening agent can be achieved so that the attachment of the sensor receptacle on the trim component provides high withdrawal forces. Furthermore, the proposed design of the sensor receptacle prevents the filling and fastening agent from entering the cavity of the sensor receptacle and from interfering with the functionality of the sensor.

According to another embodiment, the trim component may have a curvature and the through openings may be arranged in the region of the curvature. Because the sensor receptacle may be mounted on the trim component and spaced therefrom by forming a cavity, the sensor receptacle and hence the sensor may be affixed to the trim component with the desired orientation with respect of the trim component even in the region of the curvatures. The aforementioned advantages can also be realized in the area of the curvatures. In addition, the sensor receptacle and in particular the joining flange need not be individually adapted to each curvature of the trim component.

In another embodiment, the filling and fastening agent may be formed as an adhesive which can be cured under the action of electromagnetic radiation. As a result, the manufacturing process can be simplified, because the radiation source required for generating the electromagnetic radiation can be switched on exactly when the sensor receptacle is in the desired position relative to the trim component and has reached the desired orientation.

According to another embodiment, the adhesive can be cured by exposure to electromagnetic radiation of a wavelength between 350 nm and 450 nm. The wavelength between 350 nm and 450 nm produces light with a violet-blue color that is visible to the human eye. In this way, on the one hand, the operability of the radiation source can be readily determined and, on the other hand, the electromagnetic radiation in this wavelength range contains sufficient radiant energy to initiate curing of the filling and fastening agent.

BRIEF DESCRIPTION OF THE DRAWING

Exemplary embodiments of the invention will now be described in more detail with reference to the accompanying drawings, which show in FIG. 1A a schematic diagram of a sensor receptacle according to the invention in cross-section, FIG. 1B the sensor receptacle of FIG. 1A in a perspective view, FIG. 1C an enlarged view of the region X indicated in FIG. 1A, and FIG. 2 the sensor receptacle shown in FIGS. 1A to 1C, attached to a trim component.

DETAILED DESCRIPTION OF PREFERRED EMBODIMENTS

Figure 1A:
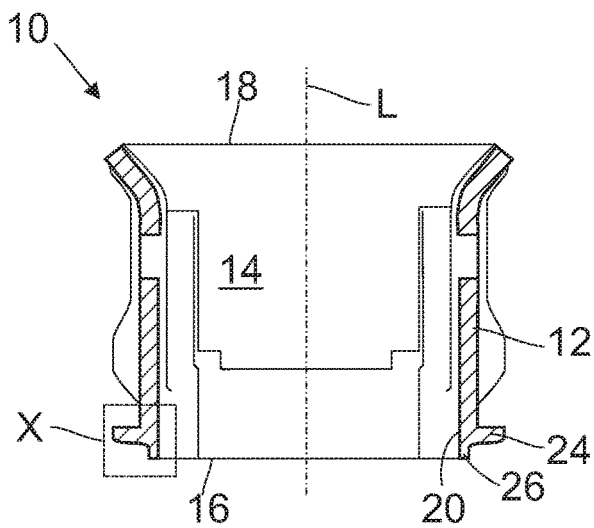

Throughout all the Figures, same or corresponding elements are generally indicated by same reference numerals Turning now to the drawing and particularly FIG. 1A, there is shown an embodiment of a sensor receptacle 10 according to the present invention in a schematic sectional view. The sensor receptacle 10 includes a wall 12, which encloses a cavity 14 and defines a longitudinal axis L of the sensor receptacle 10. The cavity 14 has a first opening 16 and a second opening 18. The first opening 16 and the second opening 18 delimit the sensor receptacle 10 in the axial direction.

Figure 1B:
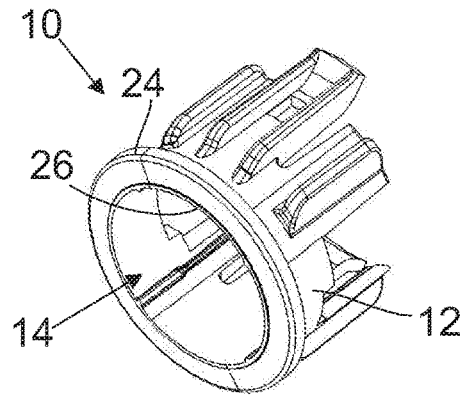

As is evident in particular from the FIG. 1B, which shows the sensor receptacle 10 illustrated in FIG. 1A in a perspective view, the sensor receptacle 10 is substantially tubular, so that the cavity 14 has an approximately cylindrical shape and forms an interior surface 20.

The cavity 14 expands toward the second opening 18, allowing a sensor 22 (see FIG. 2) to be introduced into the cavity 14 particularly easily via the second opening 18, for which purpose the sensor 22 is moved along the longitudinal axis L of the sensor receptacle 10.

Figure 1C:
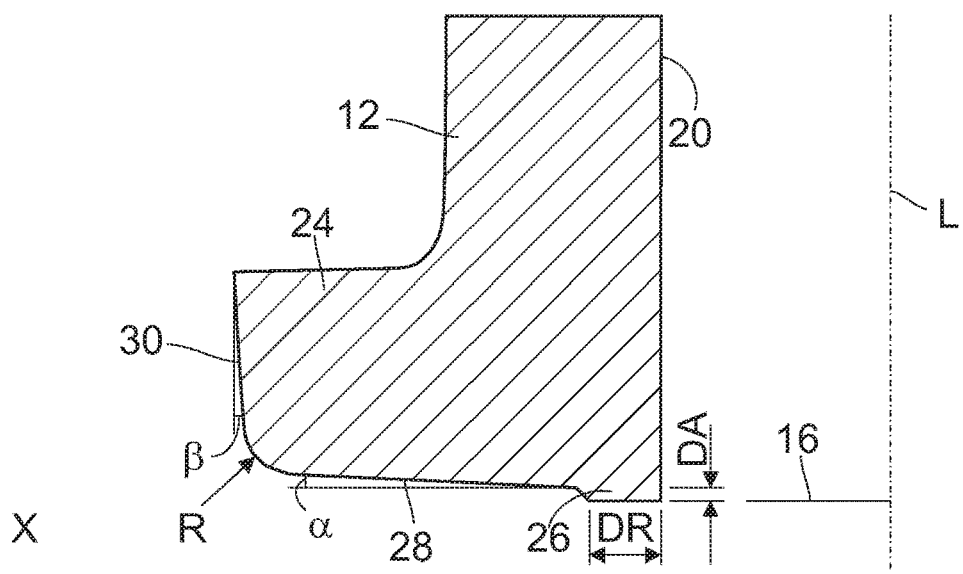

The sensor receptacle 10 has a joining flange 24 in the region of the first opening 16, which protrudes in the radial direction, i.e. perpendicular to the longitudinal axis L, over the side wall. Starting from the joining flange 24, a protrusion 26 extends along the longitudinal axis L of the sensor receptacle 10 toward the first opening 16. FIG. 1C shows the area marked in FIG. 1A not to scale and enlarged. As can be seen, the wall 12, the joining flange 24 and the protrusion 26 are designed as a one-piece component and the joining flange 24 and the protrusion 26 are formed by the wall 12. The interior surface 20 formed by the wall 12 extends continuously to the first opening 16 and has no steps or inclined portions. The joining flange 24 and the protrusion 26 are therefore aligned with the interior surface 20 along the longitudinal axis L. As seen in particular from FIG. 1B, the joining flange 24 and the protrusion 26 are formed circumferentially without any interruptions.

As shown in FIG. 1C, the protrusion 26 protrudes from the joining flange 24 with an axial distance DA. The axial distance DA is between 0.05 mm and 0.5 mm. Furthermore, the protrusion 26 extends from the interior surface 20 in the radial direction by a radial distance DR, which is between 0.3 mm and 0.7 mm. The joining flange 24 has an end face 28, which points toward the first opening 16 and which is inclined with respect to a plane extending perpendicular to the longitudinal axis L. The end face 28 thus encloses an end face angle $\alpha$ with this plane, which is between 1° and 7°, for example 4°. The end face angle $\alpha$ is oriented to face away from the first opening 16, so that the distance from the end face 28 to the first opening 16 increases radially outwardly.

In addition, the joining flange 24 has an outer surface 30, which is inclined relative to the longitudinal axis L by an outer surface angle $\beta$. The inclination is oriented so that the joining flange 24 is tapered at the outer surface 30 toward the first opening 16. The outer surface angle $\beta$ is between 1° and 5°, for example 3°.

The outer surface 30 and the end face 28 transition into one another with a radius R, which in the illustrated example is between 4 mm and 6 mm, for example 5 mm.

The sensor receptacle 10 is made of a plastic, which makes it possible to produce the sensor receptacle 10 by injection molding. With the injection molding process, a large number of sensor receptacles 10 can be provided within a short time at low cost. The plastic used is permeable to electromagnetic radiation having a wavelength between 350 nm and 450 nm.

Figure 2:
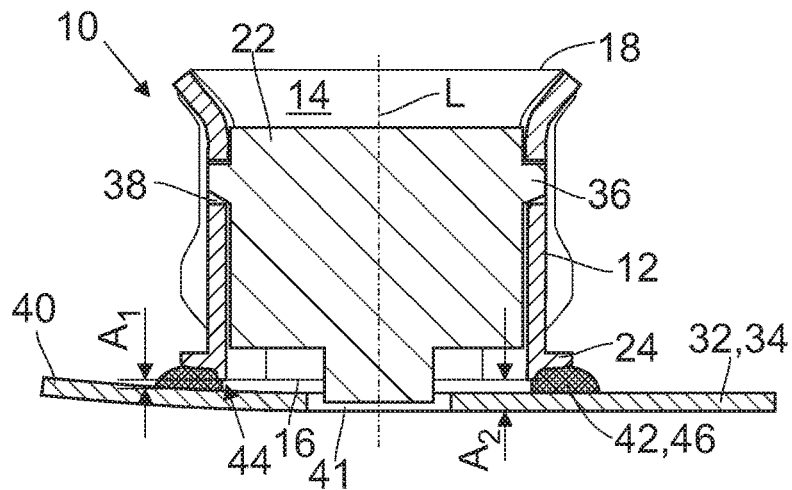

FIG. 2 shows the sensor receptacle 10 illustrated in FIGS. 1A to 1C attached to a trim component 32 of a motor vehicle 34. The trim component 32 delimits the motor vehicle 34 and thus forms, for example, the extreme front, side or rear end of the motor vehicle 34.

The sensor 22 is inserted into the cavity 14 and form-fittingly secured to the sensor receptacle 10. For this purpose, the sensor 22 has radial extensions 36 which engage in recesses 38 of the wall 12 of the sensor receptacle 10. The sensor receptacle 10 is positioned so that the sensor 22 is arranged concentrically in relation to a through opening 41 of the trim component 32, whereby the sensor 22 can interact with the surroundings of the trim component 32 or of the motor vehicle 34. Furthermore, as seen in FIG. 2, the trim component 32 has a curvature 40.

Attachment of the sensor receptacle 10 on the trim component 32 follows the following process: First, a filling and fastening agent 42 which is liquid or viscos in the initial state annularly is applied on the trim component 32 around the through-opening 41, such that the filling and fastening agent 42 is located radially outside the cavity 14 and approximately inside the area covered by the joining flange 24 when the sensor receptacle 10 is in concentric alignment with the through opening 41. Thereafter, the sensor receptacle 10 with the attached sensor 22 is, with a movement along the longitudinal axis L, moved to a position in which a cavity 44 remains between the trim component 32 and the sensor receptacle 10. For this purpose, the sensor receptacle 10 may be brought into the desired position with the aid of an unillustrated positioning and alignment device. In this position, the sensor receptacle 10 makes contact with the filling and fastening agent 42, but not directly with the trim component 32, so that the cavity 44 between the trim component 32 is filled and bridged by filling and fastening agent 42.

The proposed design of the sensor receptacle 10, and especially the protrusion 26 and the design of the joining flange 24 prevents, on the one hand, the filling and fastening agent 42 from entering the cavity 14 of the sensor receptacle 10 and thus adversely affecting the functionality of the sensor 22, when the sensor receptacle 10 is in contact with the filling and fastening agent 42. On the other hand, the design of the present invention of the sensor receptacle 10 causes a uniform distribution of the filling and fastening agent 42 which provides a large contact surface between the trim component 32, in particular the joining flange 24, and the sensor receptacle 10.

The filling and fastening agent 42 may be in the form of an adhesive 46, which is curable under the action of electromagnetic radiation. Electromagnetic radiation can be provided by an unillustrated radiation source. The radiation source may provide, for example, electromagnetic radiation with a wavelength of between 350 nm and 450 nm, for example 400 nm. The plastic material from which the sensor receptacle 10 is constructed is ideally permeable in this wavelength range, so that the electromagnetic radiation can impinge on a large part of the surface of the adhesive 46 without shadowing, thus allowed the adhesive 46 to cure evenly.

As mentioned above, the trim component 32 has a curvature 40. Consequently, the first distance $A_1$ and the second distance $A_2$ between the trim component 32 and the sensor receptacle 10 are not equal. These differences can be compensated with the filling and fastening agent 42, thereby obviating the need to match the sensor receptacle 10 and in particular the joining flange 24 to the curvature 40 of the trim component 32.

While the invention has been illustrated and described as embodied in a sensor receptacle, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A sensor receptacle for receiving a sensor of a motor vehicle, comprising,
    a wall enclosing a cavity having a first opening and a second opening and which defines a longitudinal axis L, wherein a sensor is held in the cavity and inserted into the cavity by a movement along the longitudinal axis through the first opening or through the second opening,
    a joining flange arranged in the region of the first opening, wherein the sensor receptacle is connected by way of the joining flange with a trim component of the motor vehicle by forming a cavity between the sensor receptacle and the trim component, wherein the sensor receptacle is connected to the trim component by way of a filling and fastening agent that fills the cavity, and
    a protrusion arranged on the joining flange and extending along the longitudinal axis L, wherein the joining flange and the protrusion are formed such that the filling and fastening agent is displaced away from the cavity when the sensor receptacle is connected with the trim component,
    said joining flange has an end face which is oriented toward the first opening and is inclined relative to a plane extending perpendicular to the longitudinal axis by an end face angle $\alpha$, wherein the end face angle $\alpha$ points away from the first opening and is between 1° and 7°.

2. The sensor receptacle according to claim 1, wherein the wall forms an interior surface and the joining flange is aligned with the interior surface.

3. The sensor receptacle according to claim 2, wherein the protrusion is aligned with the interior surface.

4. The sensor receptacle according to claim 3, wherein the joining flange and the protrusion are formed circumferentially.

5. The sensor receptacle according to claim 4, wherein the joining flange and the protrusion are formed integrally with the wall.

6. The sensor receptacle according to claim 2, wherein the protrusion protrudes from the joining flange with an axial distance between 0.05 mm and 0.5 mm.

7. The sensor receptacle according to claim 6, wherein the protrusion extends from the interior surface by a radial distance between 0.3 mm and 0.7 mm.

8. A sensor receptacle for receiving a sensor of a motor vehicle, comprising,
    a wall enclosing a cavity having a first opening and a second opening and which defines a longitudinal axis L, wherein a sensor is held in the cavity and inserted into the cavity by a movement along the longitudinal axis through the first opening or through the second opening,
    a joining flange arranged in the region of the first opening, wherein the sensor receptacle is connected by way of the joining flange with a trim component of the motor vehicle by forming a cavity between the sensor receptacle and the trim component, wherein the sensor receptacle is connected to the trim component by way of a filling and fastening agent that fills the cavity, and
    a protrusion arranged on the joining flange and extending along the longitudinal axis L, wherein the joining flange and the protrusion are formed such that the filling and fastening agent is displaced away from the cavity when the sensor receptacle is connected with the trim component,
    said joining flange has an end face oriented toward the first opening and inclined relative to a plane extending perpendicular to the longitudinal axis by an end face angle $\alpha$ pointing away from the first opening and is between 1° and 7°, wherein the joining flange has an outer surface inclined relative to the longitudinal axis by an outer surface angle $\beta$ of between 1° and 5° causing a taper of the joining flange toward the first opening.

9. The sensor receptacle according to claim 1, wherein the sensor receptacle is made of a plastic material, which is permeable to electromagnetic radiation of a wavelength between 350 nm and 450 nm.

10. A trim component of a motor vehicle, comprising,
one or more through holes,
one or more sensor receptacles, according to claim 1, wherein the one or more sensor receptacles are arranged in the region of one of the passage openings at least partially spaced apart from the trim component by forming a cavity, and
a filling and fastening agent filled in the cavity to affix the sensor receptacles to the trim component.

11. The trim component according to claim 10, wherein the trim component has a curvature and the through openings are arranged in the region of the curvature.

12. The trim component according to claim 11, wherein the filling and fastening agent is an adhesive curable under action of electromagnetic radiation.

13. The trim component according to claim 12, wherein the adhesive is curable under the action of electromagnetic radiation of a wavelength between 350 nm and 450 nm.

14. A sensor receptacle for receiving a sensor of a motor vehicle, comprising,
a wall enclosing a cavity having a first opening and a second opening and which defines a longitudinal axis L, wherein a sensor is held in the cavity and inserted into the cavity by a movement along the longitudinal axis through the first opening or through the second opening,
a joining flange arranged in the region of the first opening, wherein the sensor receptacle is connected by way of the joining flange with a trim component of the motor vehicle by forming a cavity between the sensor receptacle and the trim component, wherein the sensor receptacle is connected to the trim component by way of a filling and fastening agent that fills the cavity, and
a protrusion arranged on the joining flange and extending along the longitudinal axis L, wherein the joining flange and the protrusion are formed such that the filling and fastening agent is displaced away from the cavity when the sensor receptacle is connected with the trim component,
said joining flange has an end face which is oriented toward the first opening and is inclined relative to a plane extending perpendicular to the longitudinal axis by an end face angle $\alpha$, wherein the end face angle $\alpha$ points away from the first opening and is between 3° and 5°.

15. A sensor receptacle for receiving a sensor of a motor vehicle comprising,
a wall enclosing a cavity having a first opening and a second opening and which defines a longitudinal axis L, wherein a sensor held in the cavity and inserted into the cavity by a movement along the longitudinal axis through the first opening or through the second opening,
a joining flange arranged in the region of the first opening, wherein the sensor receptacle is connected by way of the joining flange with a trim component of the motor vehicle by forming a cavity between the sensor receptacle and the trim component, wherein the sensor receptacle is connected to the trim component by way of a filling and fastening agent that fills the cavity, and
a protrusion arranged on the joining flange and extending along the longitudinal axis L, wherein the joining flange and the protrusion are formed such that the filling and fastening agent is displaced away from the cavity when the sensor receptacle is connected with the trim component,
said joining flange has an outer surface which is inclined relative to the longitudinal axis by an outer surface angle $\beta$, wherein the outer surface angle $\beta$ is between 1° and 5° and causes a taper of the joining flange toward the first opening.

* * * * *